US011441692B2

(12) United States Patent
Chang

(10) Patent No.: US 11,441,692 B2
(45) Date of Patent: Sep. 13, 2022

(54) OVERFLOW AND OVERHEAT SHUTOFF SAFETY GAS INLET

(71) Applicant: SEVEN UNIVERSE INDUSTRIAL CO., LTD., Taichung (TW)

(72) Inventor: Pao-Chi Chang, Taichung (TW)

(73) Assignee: SEVEN UNIVERSE INDUSTRIAL CO., LTD., Taichung (TW)

( * ) Notice: Subject to any disclaimer, the term of this patent is extended or adjusted under 35 U.S.C. 154(b) by 0 days.

(21) Appl. No.: 16/936,687

(22) Filed: Jul. 23, 2020

(65) Prior Publication Data

US 2021/0199207 A1 Jul. 1, 2021

(30) Foreign Application Priority Data

Dec. 30, 2019 (TW) .................................. 108217463

(51) Int. Cl.
*F16K 17/00* (2006.01)
*F16K 17/38* (2006.01)
*F16K 17/32* (2006.01)

(52) U.S. Cl.
CPC ............ *F16K 17/003* (2013.01); *F16K 17/32* (2013.01); *F16K 17/38* (2013.01)

(58) Field of Classification Search
CPC ......... Y10T 137/1804; Y10T 137/7724; Y10T 137/7723; Y10T 137/7727; F16K 17/003; F16K 17/24; F16K 17/383; F16K 31/084; F16K 17/32; F16K 17/38
See application file for complete search history.

(56) References Cited

U.S. PATENT DOCUMENTS

| 958,126 | A | * | 5/1910 | Horan | .................... | F16K 17/383 |
| | | | | | | 137/75 |
| 2,569,316 | A | * | 9/1951 | Jerman | .................... | F16K 15/04 |
| | | | | | | 137/517 |
| 3,229,704 | A | * | 1/1966 | Leopold, Jr. | ............ | F16L 41/04 |
| | | | | | | 137/74 |
| 3,289,686 | A | * | 12/1966 | Tyer, Jr. | ................ | F16K 17/003 |
| | | | | | | 137/73 |
| 4,669,493 | A | * | 6/1987 | Kober | ..................... | B63B 25/12 |
| | | | | | | 137/73 |

(Continued)

FOREIGN PATENT DOCUMENTS

JP 59110973 A * 6/1984 ............. F16K 17/38

*Primary Examiner* — Jessica Cahill
(74) *Attorney, Agent, or Firm* — Demian K. Jackson; Jackson IPG PLLC

(57) ABSTRACT

An overflow and overheat shutoff safety gas inlet connector, comprising a gas inlet connector, to be connected to the gas source, with a gas inlet hole configured axially, a chamber configured on one end to be connected to the gas inlet hole, and a plurality of holding compartments configured on one side of the chamber, a connecting tube, in threaded connection with the gas inlet connector, with a convex portion on its one end, a transfer canal configured axially and going through the convex portion, said transfer canal matching the gas inlet hole, a first magnetic piece, made of a magnetic material, movably configured inside the chamber and matching the gas inlet hole and the transfer canal, able to seal the transfer canal when being pressed against the convex portion, a plurality of second magnetic pieces, made of a magnetic material, and a plurality of temperature control pieces.

20 Claims, 8 Drawing Sheets

(56) References Cited

U.S. PATENT DOCUMENTS

| | | | | |
|---|---|---|---|---|
| 4,744,382 A | * | 5/1988 | Visnic | F16K 17/003 |
| | | | | 137/68.23 |
| 4,896,690 A | * | 1/1990 | Taylor | F16K 17/14 |
| | | | | 137/73 |
| 5,213,128 A | * | 5/1993 | Baird | F16K 17/16 |
| | | | | 137/68.23 |
| 8,826,997 B2 | * | 9/2014 | Tao | F16K 31/084 |
| | | | | 169/37 |
| 2006/0000511 A1 | * | 1/2006 | Shade | F16K 31/084 |
| | | | | 137/533.11 |
| 2008/0023004 A1 | * | 1/2008 | Wu | F16K 15/04 |
| | | | | 128/204.21 |

* cited by examiner

OVERFLOW AND OVERHEAT SHUTOFF SAFETY GAS INLET

BACKGROUND OF INVENTION

1. Field of the Invention

The present invention relates generally to a gas inlet connector, and more particularly to an overflow and overheat shutoff safety gas inlet connector.

2. Description of Related Art

In conventional gas equipment, the gas outlet of the steel gas cylinder is usually connected with a gas pressure regulator. The gas pressure regulator is used to adjust the gas output flow. As a common practice, the gas pressure regulator is connected to the steel gas cylinder through a gas inlet connector. Inside the gas output terminal of a conventional gas inlet connector or steel gas cylinder, usually a check valve is configured. When the inlet pressure is too high (overflow state), the gas passage will be shut off by the steel ball, magnet or spring plate inside the check valve (the steel ball or magnet can move to shut off the gas passage, while the spring plate can transform to block the gas passage). In this way, the gas equipment can have the function to shut off the gas passage in case of overflow. However, in practice, if the gas flow is gradually increased, there will be conditions that the steel ball or magnet will not move, or the spring plate will not transform simultaneously to shut off the gas flow. Such conditions will affect the operational safety of the gas equipment.

In addition, apart from the function to shut off gas flow upon overflow, the safety design of conventional gas equipment also requires the function to immediately shut off the gas when the environmental temperature is too high, so as to avoid accidental fire hazard due to continuous gas outflow. In the current market, there are existing gas pressure regulators or alternative products configured with an overheat shutoff mechanism, which can be used as the product with the aforementioned function to shut off the gas flow.

In other words, at present, overflow shutoff or overheat shutoff mechanisms are usually configured in different products (or different components of one product). Users have to combine the two different products to realize the dual function to shut off the gas under overflow or overheat conditions.

SUMMARY OF THE INVENTION

The main object of the present invention is to provide an overflow and overheat shutoff safety gas inlet connector, which has a compact structure and can offer dual functions to shut off the gas flow upon occurrence of overflow or overheat, and can be used on any gas inlet or the inlet of any gas pressure regulator. It can effectively solve the problem that conventionally the dual functions of overflow and overheat shutoff can only be achieved by combining two different products, or that the conventional overheat shutoff mechanism can not operate independently of the check valve of the gas source (e.g. steel gas cylinder). Such an invention will have practical value.

Therefore, to achieve the above object, the present invention provides an overflow and overheat shutoff safety gas inlet connector, comprising a gas inlet connector, to be connected to the gas source, with a gas inlet hole configured axially, a chamber configured on one end and connected to the gas inlet hole, and a plurality of holding compartments configured on one side of the chamber in concave forms; a connecting tube, in threaded connection with the gas inlet connector, with a convex portion configured on its one side, a transfer canal configured axially and going through the convex portion; a first magnetic piece, made of a magnetic material, movably configured inside the chamber, able to seal the transfer canal when pressed against the transfer canal, or, a plurality of vents are configured on it, staggered with the transfer canal; a plurality of second magnetic pieces, made of a magnetic material, movably configured inside the holding compartments to attract the first magnetic piece; a plurality of temperature control pieces, made of a material that can be softened or melted at a preset temperature, configured on one side of the second magnetic pieces, so that the second magnetic pieces can be fixed inside the holding compartments.

DETAILED DESCRIPTION OF THE PREFERRED EMBODIMENTS

Below are detailed descriptions of the present invention, taking a plurality of preferred embodiments as examples, and referring to the accompanying figures.

Figure 1:
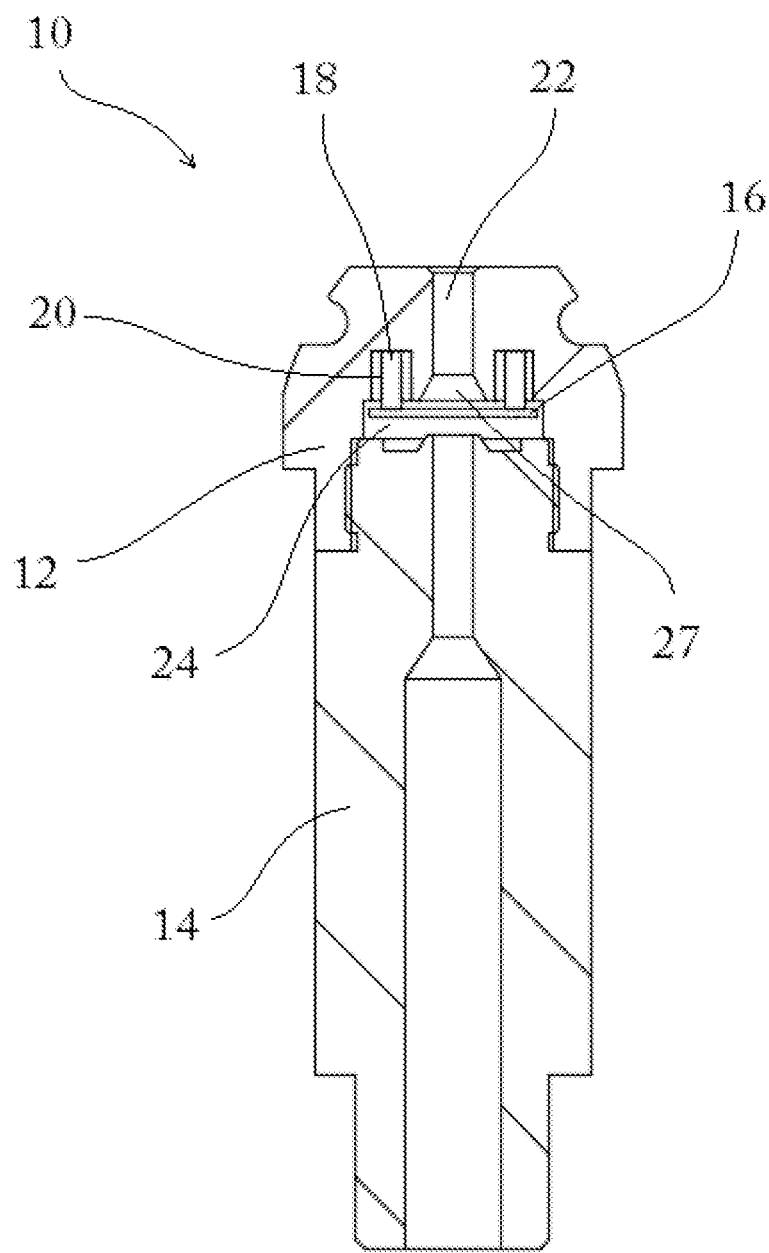
FIG. 1 is a combined sectional view of the 1st preferred embodiment of the present invention.
Figure 2:
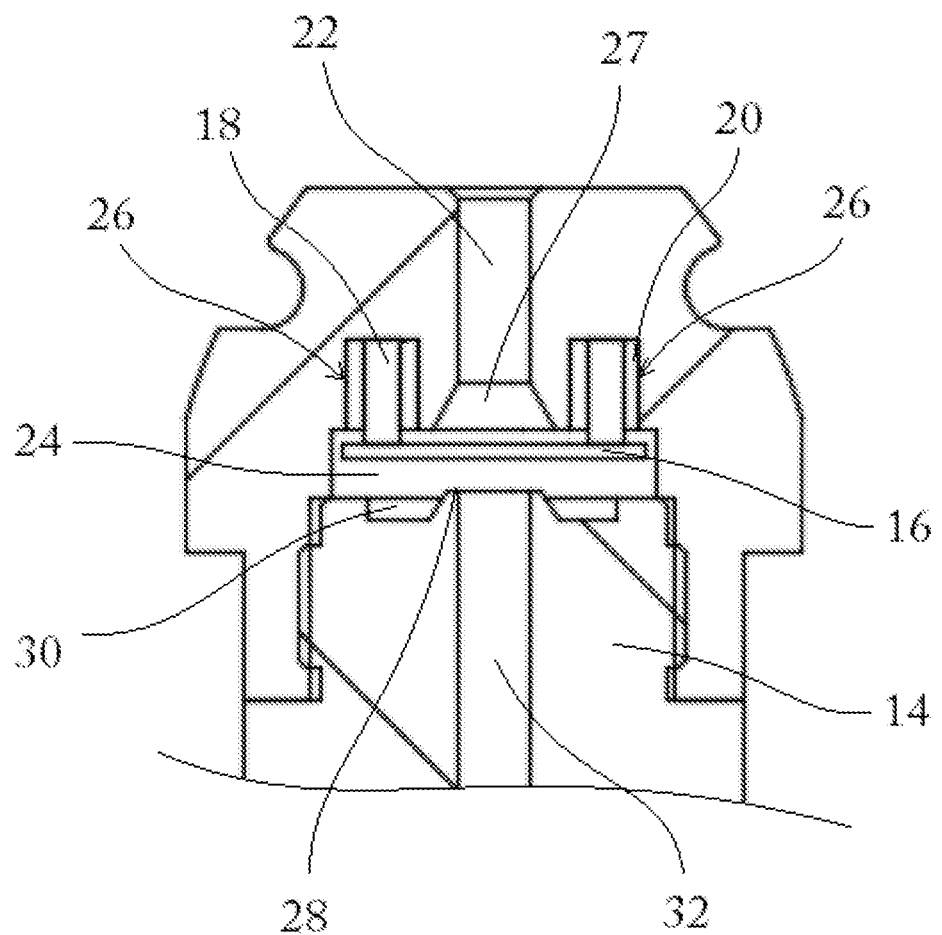
FIG. 2 is a partially enlarged view of the 1st preferred embodiment of the present invention.

Firstly, referring to FIG. 1 and FIG. 2, in the 1st preferred embodiment of the present invention, the overflow and overheat shutoff safety gas inlet connector 10 comprises a gas inlet connector 12, a connecting tube 14, a first magnetic piece 16, two second magnetic pieces 18 and two temperature control pieces 20.

The gas inlet connector 12 is connected to the gas source (e.g., a gas cylinder or a gas bottle), with a gas inlet hole 22 configured axially. On its one end, a chamber 24 is configured to communicate with the gas inlet hole 22. On the inner side of the chamber 24, two opposite holding compartments 26 are configured, roughly in the shape of a round pit. The gas inlet hole 22 is to introduce gas. Its one end connecting to the chamber 24 is further configured with a conical part 27.

The connecting tube 14 is in threaded connection with the chamber 24 of the gas inlet connector 12. Its one end is configured with a convex portion 28 and a concave portion 30. Said concave portion 30 goes around the outside of the convex portion 28. A transfer canal 32 is configured axially and goes through the convex portion 28, matching the gas inlet hole 22, for gas output.

The first magnetic piece 16 is made of a magnetic material, being either a plate-shaped magnet or a plate-shaped metal. In the present embodiment, it is a round metal plate, movably configured inside the chamber 24 and located between the gas inlet connector 12 and the connecting tube 14, matching the gas inlet hole 22. When it is pushed by the gas pressure to be pressed against the convex portion 28, it can seal the transfer canal 32 (such as the overflow state mentioned below), and consequently block the chamber 24 and the transfer canal 32, so that gas can not flow into the transfer canal 32.

The two second magnetic pieces 18 are made of a magnetic material, being either a rod-shaped magnet or a rod-shaped metal. In the present embodiment, it is a rod-shaped magnet, movably configured inside the respective holding compartments 26 (the outer diameter of the second magnetic piece 18 is smaller than the inner diameter of the holding compartments 26), and protruding out of the holding compartments 26 to attract the first magnetic piece 16.

The two temperature control pieces 20 are roughly in the shape of ring, sheathed around the outside of the two second magnetic pieces 18 and abutting the inner wall of the holding compartments 26, able to fix the second magnetic pieces 18 inside the holding compartments 26. They are made of a polymer material that can be softened or melted at a preset temperature, such as thermoplastics. The softening temperature is about 140° C. (the material can be adjusted as required to change the softening temperature). When the environmental temperature reaches 140° C., the two temperature control pieces 20 will be softened or melted, so that the two second magnetic pieces 18 lose the support of the two temperature control pieces 20 and fall apart from the holding compartments 26.

Thus, the gas entered from the gas inlet hole 22 can go through the gaps between the conical part 27, the first magnetic piece 16 and the inner wall of the chamber 24 (formed by one end of the second magnetic piece 18 protruding out of the holding compartment 26) and be output from the transfer canal 32. When the pushing force resulting from the inlet gas flow upon the first magnetic piece 16 is lower than the attraction force applied by the second magnetic pieces 18 upon the first magnetic piece 16, the gas can smoothly be input from the gas inlet connector 12 and be output from the connecting tube 14.

Figure 3:
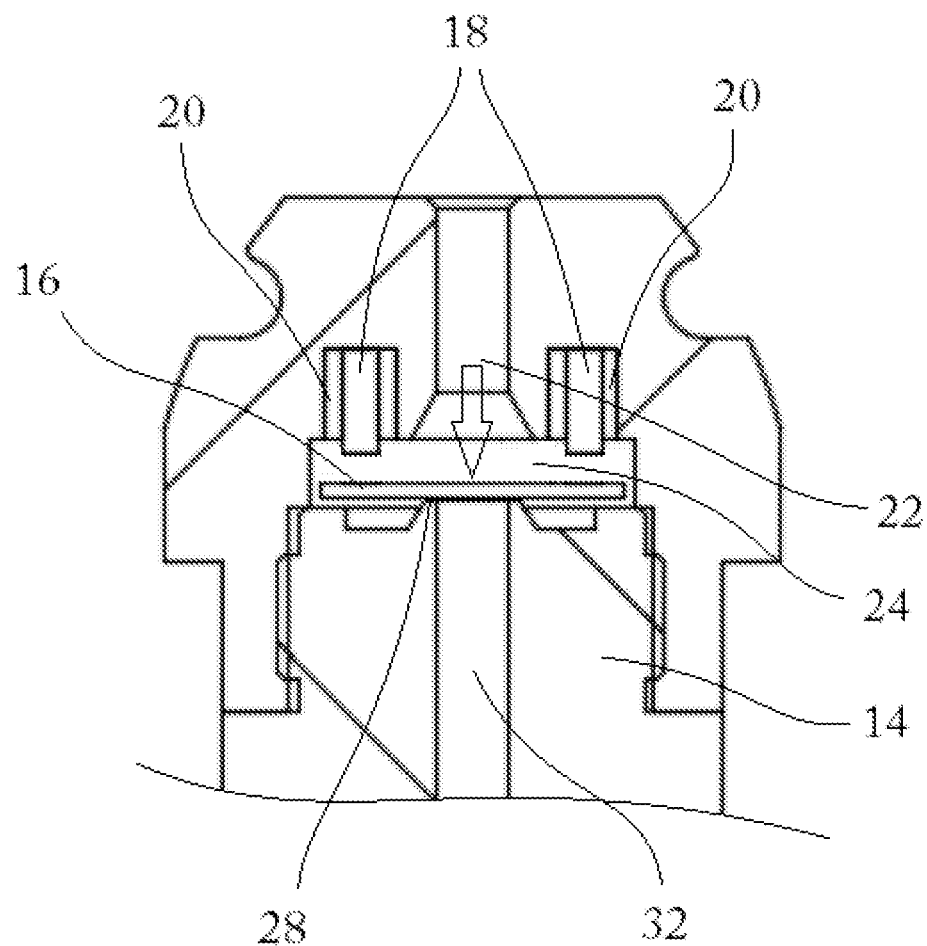
FIG. 3 is an overflow shutoff action view of the 1st preferred embodiment of the present invention.

If the gas flow from the gas source is too much (under an overflow state), and the pushing force overcomes the attraction force applied by the second magnetic pieces 18 upon the first magnetic piece 16, as shown in FIG. 3, the first magnetic piece 16 will fall apart from the two second magnetic pieces 18, and the first magnetic piece 16 will be pushed by the gas and be pressed against the convex portion 28, and will consequently seal the transfer canal 32, realizing the safety protection effect upon overflow.

Figure 4:
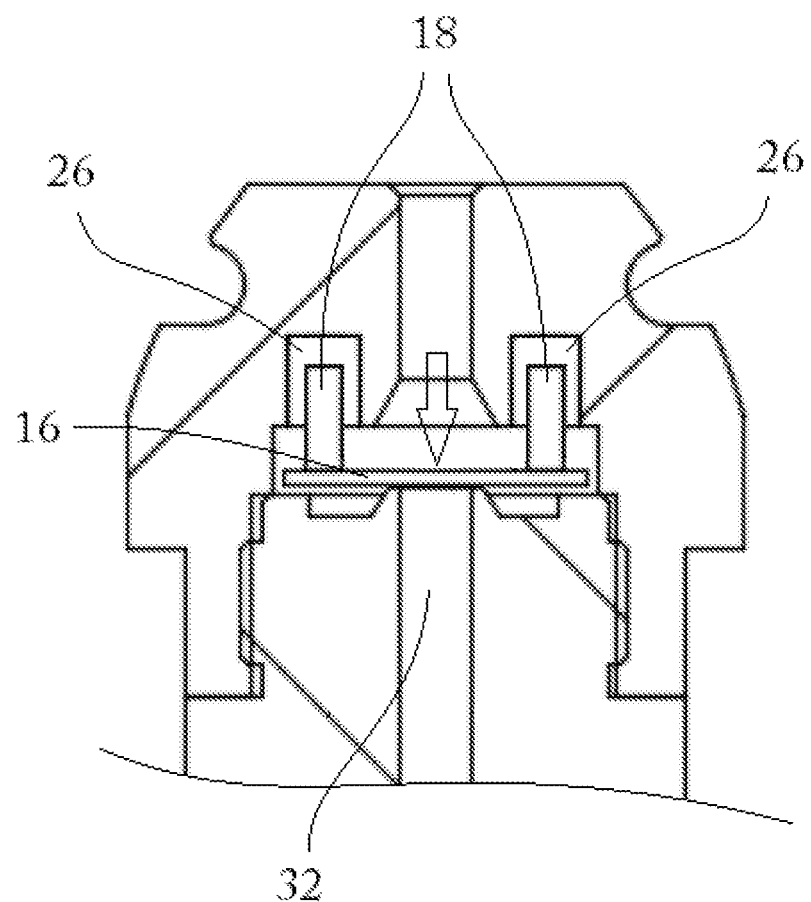
FIG. 4 is an overheat shutoff action view of the 1st preferred embodiment of the present invention.

Further, even if the afore-mentioned overflow state does not occur, when the environmental temperature of the overflow and overheat shutoff safety gas inlet connector 10 increases to the softening or melting temperature of the temperature control piece 20, under the continuous pushing force from the gas upon the first magnetic piece 16, the two softening or melting temperature control pieces 20 can no longer keep the two second magnetic pieces 18 inside the holding compartments 26, the two second magnetic pieces 18 will fall out of the holding compartments 26, and the first magnetic piece 16 will be pressed against the convex portion 28 and seal the transfer canal 32, realizing the safety protection effect upon overheat, as shown in FIG. 4. This can avoid accidental fire hazard.

Of course, the softening and melting temperature of the temperature control piece 20 is dependent on the melting point of its material. As required, the present invention can use temperature control pieces 20 made of different materials, with different softening or melting temperatures.

In sum, the first magnetic piece 16, second magnetic pieces 18 and the temperature control pieces 20 form a structure similar to a valve, which can shut off the gas flow depending on the gas flow and environmental temperature. If there is no change to the gas flow or the environmental temperature, the gas input and output will continue.

Of course, the overheat shutoff function of the present invention of an overflow and overheat shutoff safety gas inlet connector can take effect once only. After being used, it must be disassembled to replace new temperature control pieces 20 and the first and second magnetic pieces 16, 18.

Figure 5:
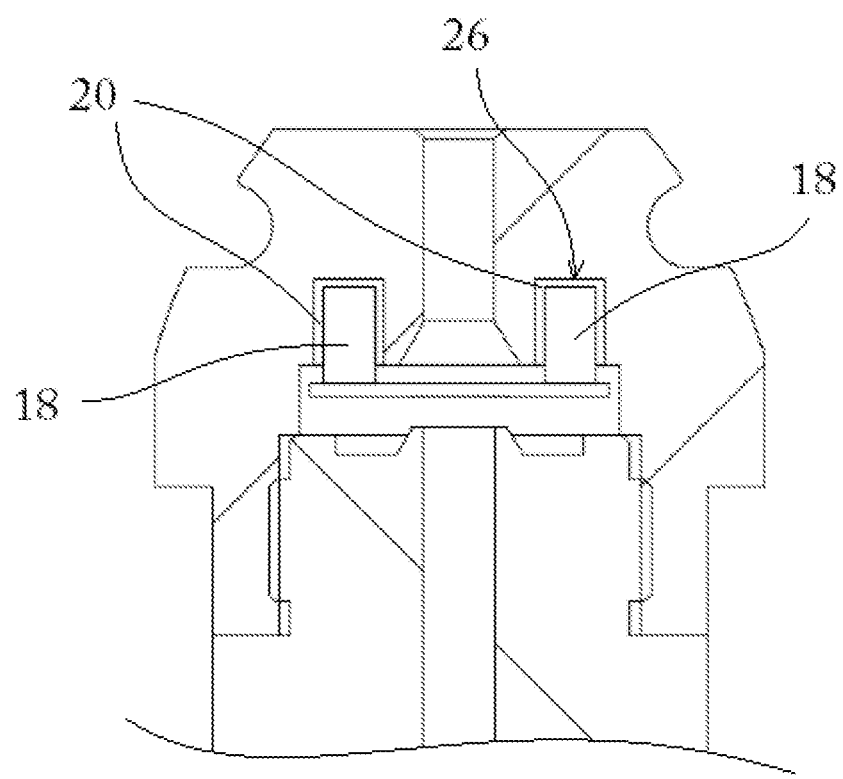
FIG. 5 is a partially enlarged view of the 2 nd preferred embodiment of the present invention.
Figure 6:
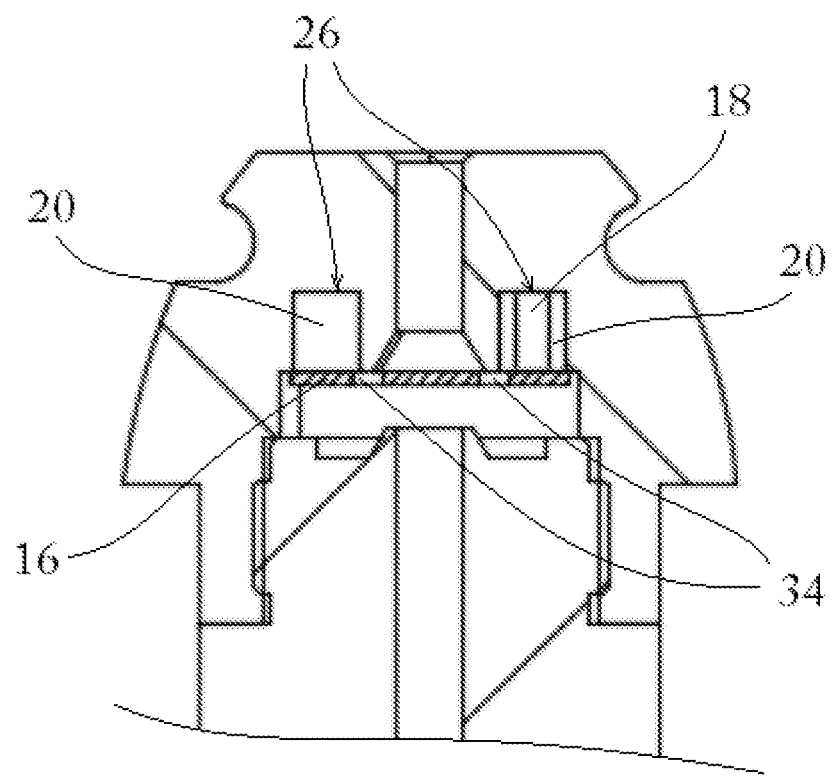
FIG. 6 is a partially enlarged view of the 3 rd preferred embodiment of the present invention.
Figure 7:
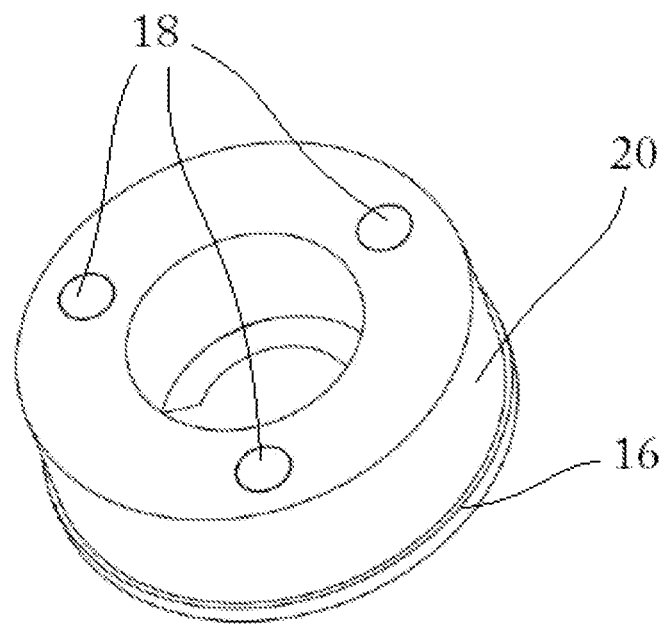
FIG. 7 is a combined perspective view of the 1st and 2nd magnetic pieces and the temperature control piece in the 4th preferred embodiment of the present invention.
Figure 8:
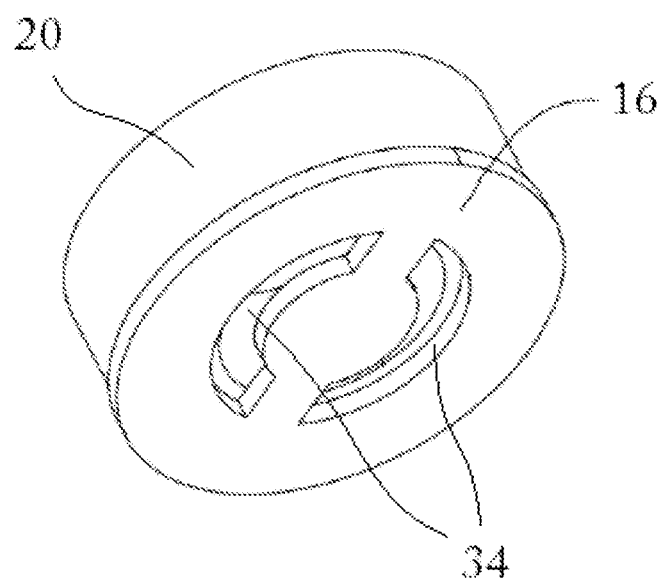
FIG. 8 is another combined perspective view of the 1st and 2nd magnetic pieces and the temperature control piece in the 4th preferred embodiment of the present invention.
Figure 9:
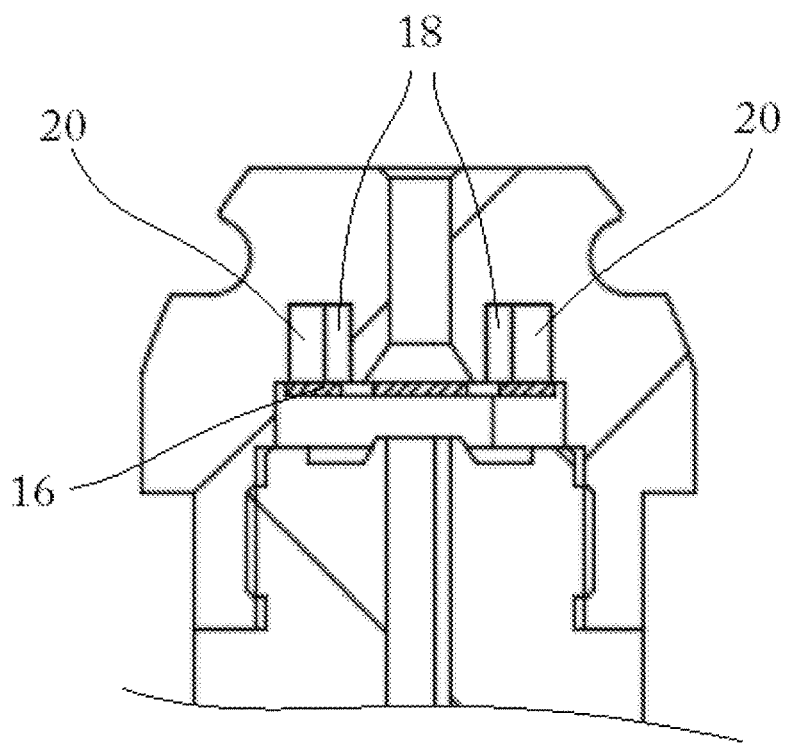
FIG. 9 is a partially enlarged view of the 5th preferred embodiment of the present invention.
Figure 10:
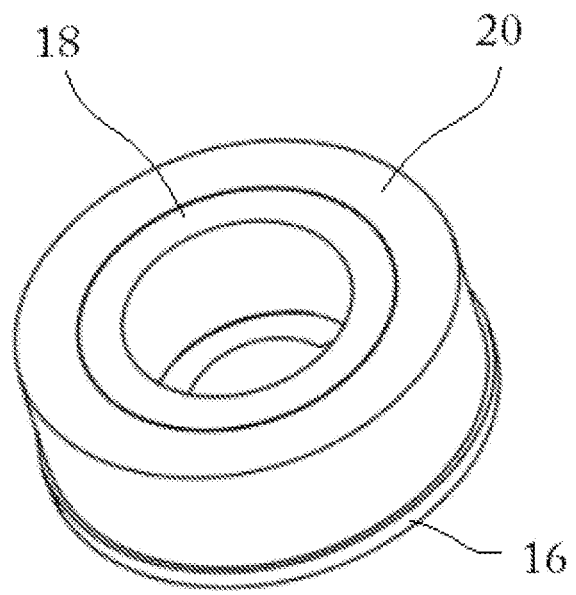
FIG. 10 is a combined perspective view of the 1st and 2nd magnetic pieces and the temperature control piece in the 5th embodiment of the present invention.

As shown in FIG. 5, the two temperature control pieces 20 of the present invention of an overflow and overheat shutoff safety gas inlet connector can also be configured in the shape of a shell to cover the inner ends of two second magnetic pieces 18, and be embedded into each of the holding compartments 26. Alternatively, as shown in FIG. 6 to FIG. 8, the number of the second magnetic pieces 18 can also be 3, to form a three point supporting structure, and the holding compartments 26 and temperature control pieces 20 can be configured in the shape of a ring, and the second magnetic pieces 18 is embedded inside the temperature control piece 20. Or, as shown in FIG. 9 and FIG. 10, the holding compartments 26, the second magnetic pieces 18, and the temperature control pieces 20 are all configured in the shape of a ring. In any of the afore-mentioned forms, either embedding (the temperature control piece 20 covering one end of the second magnetic piece 18 and embedded inside the holding compartments 26), or 3 point, or ring shape (in terms of the number and shape of the second magnetic pieces 18), the above-said overflow and overheat shutoff safety function can be achieved.

Further, in the above 3-point structure, or ring-shaped structure, the second magnetic piece 18 and temperature control piece 20 of the overflow and overheat shutoff safety gas inlet connector do not protrude out of the holding compartment 26, the first magnetic piece 16 is pressed against the opening of the holding compartment 26 and can not output gas. To achieve the effect of gas transmission, on the position of the first magnetic piece 16 staggering with the transfer canal 32 is further configured with two vents 34. The two vents 34 are communicated with the conical part 27, so that gas can still go through the conical part 27, the two vents 34, the chamber 24, and be output from the transfer canal 32.

To summarize, in the present invention of an overflow and overheat shutoff safety gas inlet connector, through the combination of the first magnetic piece, the second magnetic pieces and the temperature control pieces that can be softened or melted, a valve-like mechanism is formed to achieve dual safety functions of overflow and overheat shutoff. It can be used on any gas inlet, or the inlet of all gas pressure regulators, avoiding the trouble of conventional method to combine a product having overheat shutoff function with the gas source check valve (such as a steel gas cylinder equipped with a check valve). The present invention offers a compact structure and has practical value.

It is to be noted that, in the present invention, each of the holding compartments, first magnetic piece, second magnetic pieces and the temperature control pieces are not limited to the afore-mentioned forms. As long as each of the components can form a structure similar to a valve, and under the condition of gas overflow, the first magnetic piece can overcome the attraction by the second magnetic piece and seal the transfer canal, and under excessive environmental temperature, the temperature control pieces can be softened or melted, and the second magnetic pieces are no longer fixed inside the holding compartments, the first and second magnetic pieces can be pushed by the gas pressure, and the first magnetic piece will seal the transfer canal to achieve dual safety effect of overflow and overheat shutoff, such configurations meet the prerequisites of the present invention and are covered by the claims. In addition, between the inner walls of the second magnetic piece and the holding compartment, a plurality of spring plates can be configured to match the strength of the magnetic force of the second magnetic piece, so that an expected overheat shutoff effect can be achieved through appropriate adjustment.

While the means of specific embodiments in the present invention have been described by reference drawings, numerous modifications and variations could be made thereto by those skilled in the art without departing from the scope and spirit of the invention set forth in the claims. The modifications and variations should be in a range limited by the specification of the present invention.

What is claimed is:

1. An overflow and overheat shutoff safety gas inlet connector, comprising: a gas inlet connector, to be connected to a gas source, with a gas inlet hole configured axially, a chamber configured on one end to be connected to the gas inlet hole, and a plurality of holding compartments configured on one side of the chamber; a connecting tube, in threaded connection with the gas inlet connector, with a convex portion on one end of the connecting tube, a transfer canal configured axially and going through the convex portion; a first magnetic piece, made of a magnetic material, movably configured inside the chamber, able to seal the transfer canal when being pressed against the convex portion; a plurality of second magnetic pieces, made of a magnetic material, movably configured inside the holding compartments and protruding out of the holding compartments to attract the first magnetic piece; and a plurality of temperature control pieces, made of a material that can be softened or melted at a preset temperature, configured on one side of the second magnetic piece, so that the plurality of second magnetic pieces can be fixed inside the holding compartments; when the temperature control pieces are softened or melted, the plurality of second magnetic pieces can immediately fall apart from the holding compartments.

2. The overflow and overheat shutoff safety gas inlet connector defined in claim 1, wherein, one side of the chamber of the gas inlet connector is configured with more than two holding compartments.

3. The overflow and overheat shutoff safety gas inlet connector defined in claim 2, wherein said first magnetic piece is sized to be in the shape of a plate, able to seal the transfer canal when being pressed against the convex portion.

4. The overflow and overheat shutoff safety gas inlet connector defined in claim 2, wherein said temperature control piece is sized to be in the shape of a ring, sheathed around the periphery of the plurality of second magnetic pieces and abutting an inner wall of the plurality of holding compartments.

5. The overflow and overheat shutoff safety gas inlet connector defined in claim 2, wherein said plurality of temperature control pieces is sized to be in the shape of a shell, covering one end of the plurality of second magnetic pieces and abutting an inner wall of the plurality of holding compartments.

6. The overflow and overheat shutoff safety gas inlet connector defined in claim 1, wherein, one side of the chamber of the gas inlet connector is configured with a ring-shaped holding compartment.

7. The overflow and overheat shutoff safety gas inlet connector defined in claim 6, wherein said first magnetic piece is sized to be in the shape of a plate, able to seal the transfer canal when being pressed against the convex portion.

8. The overflow and overheat shutoff safety gas inlet connector defined in claim 1, wherein, one end of the connecting tube is configured with a ring-shaped groove, going around the periphery of the convex portion.

9. The overflow and overheat shutoff safety gas inlet connector defined in claim 1, wherein the softening temperature of the temperature control piece is about 140° C.

10. The overflow and overheat shutoff safety gas inlet connector defined in claim 1, wherein an end of the gas inlet hole connected to the chamber is further configured with a conical part.

11. An overflow and overheat shutoff safety gas inlet connector, comprising: a gas inlet connector, to be connected to a gas source, with a gas inlet hole configured axially, a chamber configured on one end to be connected to the gas inlet hole, and a plurality of holding compartments configured on one side of the chamber; a connecting tube, in threaded connection with the gas inlet connector, with a convex portion configured on one end of the connecting tube, a transfer canal configured axially and going through the convex portion; a first magnetic piece, made of a magnetic material, configured with a plurality of vents, movably configured inside the chamber, the vents being staggered with the transfer canal; the transfer canal can be sealed when the first magnetic piece is pressed against the convex portion; a plurality of second magnetic pieces, made of a magnetic material, movably configured inside the holding compartments to attract the first magnetic piece, so that the first magnetic piece can be pressed against the opening of the holding compartments; and a plurality of temperature control pieces, made of a material that can be softened or melted at a preset temperature, configured on one side of the second magnetic piece, so that the plurality of second magnetic pieces can be fixed inside the holding compartments; when the temperature control pieces are softened or melted, the plurality of second magnetic pieces can immediately fall apart from the holding compartments.

12. The overflow and overheat shutoff safety gas inlet connector defined in claim 11, wherein, one side of the chamber of the gas inlet connector is configured with more than two holding compartments.

13. The overflow and overheat shutoff safety gas inlet connector defined in claim 11, wherein, one side of the chamber of the gas inlet connector is configured with a ring-shaped holding compartment.

14. The overflow and overheat shutoff safety gas inlet connector defined in claim 13, wherein said first magnetic piece is sized to be in the shape of a plate, able to seal the transfer canal when being pressed against the convex portion.

15. The overflow and overheat shutoff safety gas inlet connector defined in claim 12, wherein said first magnetic piece is sized to be in the shape of a plate, able to seal the transfer canal when being pressed against the convex portion.

16. The overflow and overheat shutoff safety gas inlet connector defined in claim 12, wherein said temperature control piece is sized to be in the shape of a ring, sheathed around the periphery of the plurality of second magnetic pieces and abutting an inner wall of the plurality of holding compartments.

17. The overflow and overheat shutoff safety gas inlet connector defined in claim 12, wherein said plurality of temperature control pieces is sized to be in the shape of a shell, covering one end of the plurality of second magnetic pieces and abutting an inner wall of the plurality of holding compartments.

18. The overflow and overheat shutoff safety gas inlet connector defined in claim 11, wherein, one end of the connecting tube is configured with a ring-shaped groove, going around the periphery of the convex portion.

19. The overflow and overheat shutoff safety gas inlet connector defined in claim 11, wherein the softening temperature of the temperature control piece is about 140° C.

20. The overflow and overheat shutoff safety gas inlet connector defined in claim 11, wherein an end of the gas inlet hole connected to the chamber is further configured with a conical part.

* * * * *